United States Patent
Ayyasamy et al.

(10) Patent No.: US 10,555,370 B2
(45) Date of Patent: Feb. 4, 2020

(54) SYSTEM AND METHOD FOR PUSH-TO-TALK (PTT) IN HIGH LATENCY NETWORKS

(71) Applicant: Kodiak Networks, Inc., Plano, TX (US)

(72) Inventors: Ravi Ayyasamy, Plano, TX (US); Brahmananda R. Vempati, Dallas, TX (US); Krishnakant M. Patel, Richardson, TX (US); Bibhudatta Biswal, Richardson, TX (US); Shantanu Konwar, Bangalore (IN); Vadiraj Villivalam, Bangalore (IN)

(73) Assignee: KODIAK NETWORKS, INC., Plano, TX (US)

( * ) Notice: Subject to any disclaimer, the term of this patent is extended or adjusted under 35 U.S.C. 154(b) by 0 days.

(21) Appl. No.: 15/717,742

(22) Filed: Sep. 27, 2017

(65) Prior Publication Data

US 2018/0092134 A1 Mar. 29, 2018

Related U.S. Application Data

(60) Provisional application No. 62/401,013, filed on Sep. 28, 2016.

(51) Int. Cl.
*H04W 76/00* (2018.01)
*H04W 4/10* (2009.01)
(Continued)

(52) U.S. Cl.
CPC ......... *H04W 76/45* (2018.02); *H04L 65/4061* (2013.01); *H04W 4/10* (2013.01); *H04L 67/26* (2013.01)

(58) Field of Classification Search
CPC ......... H04W 76/45; H04W 4/10; H04W 4/06; H04W 4/08; H04W 36/24; H04W 36/30;
(Continued)

(56) References Cited

U.S. PATENT DOCUMENTS

| 3,912,874 A | 10/1975 | Botterell et al. |
| 4,796,293 A | 1/1989 | Blinken et al. |

(Continued)

FOREIGN PATENT DOCUMENTS

| GB | 2338150 A | 3/1998 |
| JP | 200392776 A | 10/2004 |

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.

(Continued)

*Primary Examiner* — Edward F Urban
*Assistant Examiner* — Ralph H Justus (57) ABSTRACT

In an embodiment, a method includes: accessing, by a push to talk (PTT) server, a PTT session with a PTT client operating in a first network; detecting, by the PTT server, a transition by the PTT client from the first network to a second network, the second network having a lower throughput or a higher latency than the first network; and adapting, by the PTT server, one or more parameters of a plurality of communication protocols in response to detecting the transition by the PTT client from the first network to the second network, the communication protocols being host layer protocols used by the PTT server to communicate with the PTT client.

14 Claims, 4 Drawing Sheets (51) Int. Cl.
*H04L 29/06* (2006.01)
*H04W 76/45* (2018.01)
*H04L 29/08* (2006.01)

(58) Field of Classification Search
CPC .............. H04W 76/005; H04W 80/04; H04L 65/4061; H04L 67/26
USPC ........................................................ 455/518
See application file for complete search history.

(56) References Cited

U.S. PATENT DOCUMENTS

| | | | |
|---|---|---|---|
| 5,353,328 A | 10/1994 | Jokimies | |
| 5,442,809 A | 8/1995 | Diaz et al. | |
| 5,546,449 A | 8/1996 | Hogan et al. | |
| 5,711,011 A | 1/1998 | Urs et al. | |
| 5,752,196 A | 5/1998 | Ahvenainen et al. | |
| 5,987,318 A | 11/1999 | Alperovich et al. | |
| 5,987,331 A | 11/1999 | Grube et al. | |
| 6,011,976 A | 1/2000 | Michaels et al. | |
| 6,021,326 A | 2/2000 | Nguyen | |
| 6,138,011 A | 10/2000 | Sanders, III et al. | |
| 6,141,556 A | 10/2000 | Dougherty et al. | |
| 6,192,119 B1 | 2/2001 | Wilson | |
| 6,304,558 B1 | 10/2001 | Mysore | |
| 6,397,054 B1 | 5/2002 | Hoirup et al. | |
| 6,405,030 B1 | 6/2002 | Suprunov | |
| 6,411,815 B1 | 6/2002 | Balasuriya | |
| 6,473,501 B1 | 10/2002 | Paulsrud | |
| 6,477,366 B1 | 11/2002 | Valentine et al. | |
| 6,477,387 B1 | 11/2002 | Jackson et al. | |
| 6,549,773 B1 | 4/2003 | Linden et al. | |
| 6,577,874 B1 | 6/2003 | Dailey | |
| 6,606,305 B1 | 8/2003 | Boyle et al. | |
| 6,628,937 B1 | 9/2003 | Salin | |
| 6,661,878 B1 | 12/2003 | Mirashrafi et al. | |
| 6,725,053 B2 | 4/2004 | Rosen et al. | |
| 6,751,468 B1 | 6/2004 | Heubel et al. | |
| 6,801,762 B1 | 10/2004 | Huilgol | |
| 6,856,676 B1 | 2/2005 | Pirot et al. | |
| 6,865,398 B2 | 3/2005 | Mangal et al. | |
| 6,892,074 B2 | 5/2005 | Tarkiainen et al. | |
| 6,895,254 B2 | 5/2005 | Dorenbosch | |
| 6,898,436 B2 | 5/2005 | Crockett et al. | |
| 6,993,355 B1 | 1/2006 | Pershan | |
| 6,996,414 B2 | 2/2006 | Vishwanathan et al. | |
| 7,026,926 B1 | 4/2006 | Walker, III | |
| 7,043,266 B2 | 6/2006 | Chaturvedi et al. | |
| 7,082,316 B2 | 7/2006 | Elden et al. | |
| 7,085,364 B1 | 8/2006 | Ahmed et al. | |
| 7,099,291 B2 | 8/2006 | Harris et al. | |
| 7,123,905 B1 | 10/2006 | Allaway et al. | |
| 7,170,863 B1 | 1/2007 | Denman et al. | |
| 7,231,225 B2 | 6/2007 | Rao et al. | |
| 7,236,580 B1 | 6/2007 | Sarkar et al. | |
| 7,330,540 B2 | 2/2008 | Darby et al. | |
| 7,366,535 B2 | 4/2008 | Glass et al. | |
| 7,403,775 B2 | 7/2008 | Patel et al. | |
| 7,460,861 B2 | 12/2008 | Zabawskj | |
| 7,529,557 B2 | 5/2009 | Farrill | |
| 7,689,238 B2 | 3/2010 | Biswas et al. | |
| 7,738,861 B2 | 6/2010 | Fournier | |
| 7,738,892 B2 | 6/2010 | Ayyasamy et al. | |
| 7,738,896 B2 | 6/2010 | Patel et al. | |
| 7,751,348 B2 | 7/2010 | Shaffer et al. | |
| 7,764,950 B2 | 7/2010 | Patel et al. | |
| 7,787,896 B2 | 8/2010 | Kundu et al. | |
| 7,797,010 B1 | 9/2010 | Manroa et al. | |
| 7,813,722 B2 | 10/2010 | Patel et al. | |
| 7,853,279 B2 | 12/2010 | Patel et al. | |
| 8,036,692 B2 | 10/2011 | Ayyasamy et al. | |
| 8,244,252 B2 | 8/2012 | Descombes | |
| 8,369,829 B2 | 2/2013 | Nagubhai et al. | |
| 8,478,261 B2 | 7/2013 | Vempati et al. | |
| 8,498,660 B2 | 7/2013 | Lawler et al. | |
| 8,670,760 B2 | 3/2014 | Lawler et al. | |
| 8,676,189 B2 | 3/2014 | Lawler et al. | |
| 8,712,411 B1* | 4/2014 | Puliatti | H04W 4/00 455/434 |
| 2001/0005372 A1 | 6/2001 | Cave et al. | |
| 2002/0009990 A1 | 1/2002 | Kleier et al. | |
| 2002/0024943 A1 | 2/2002 | Karaul et al. | |
| 2002/0037735 A1* | 3/2002 | Maggenti | H04L 63/0428 455/517 |
| 2002/0077136 A1 | 6/2002 | Maggenti et al. | |
| 2002/0086659 A1 | 7/2002 | Lauper | |
| 2002/0086676 A1 | 7/2002 | Hendrey et al. | |
| 2002/0102989 A1 | 8/2002 | Calvert et al. | |
| 2002/0187750 A1 | 12/2002 | Majumdar | |
| 2002/0196781 A1 | 12/2002 | Salovuori | |
| 2003/0009463 A1 | 1/2003 | Gallant | |
| 2003/0016632 A1 | 1/2003 | Refai et al. | |
| 2003/0017836 A1 | 1/2003 | Vishwanathan et al. | |
| 2003/0078064 A1 | 4/2003 | Chan | |
| 2003/0119540 A1 | 6/2003 | Mathis | |
| 2003/0148779 A1 | 8/2003 | Aravamudan et al. | |
| 2003/0149774 A1 | 8/2003 | McConnell et al. | |
| 2003/0153343 A1 | 8/2003 | Crockett et al. | |
| 2003/0190888 A1 | 10/2003 | Mangal et al. | |
| 2004/0032843 A1 | 2/2004 | Schaefer et al. | |
| 2004/0057449 A1 | 3/2004 | Black | |
| 2004/0067751 A1 | 4/2004 | Vandermeijden et al. | |
| 2004/0095954 A1 | 5/2004 | Varney et al. | |
| 2004/0121760 A1 | 6/2004 | Westman et al. | |
| 2004/0127233 A1 | 7/2004 | Harris et al. | |
| 2004/0152441 A1 | 8/2004 | Wong | |
| 2004/0176100 A1 | 9/2004 | Florkey et al. | |
| 2004/0179531 A1 | 9/2004 | Bi et al. | |
| 2004/0196826 A1 | 10/2004 | Bao et al. | |
| 2004/0203793 A1 | 10/2004 | Dorenbosch | |
| 2004/0219941 A1 | 11/2004 | Haaramo et al. | |
| 2004/0224710 A1 | 11/2004 | Koskelainen et al. | |
| 2004/0228292 A1 | 11/2004 | Edwards | |
| 2004/0259580 A1 | 12/2004 | Florkey et al. | |
| 2005/0047362 A1 | 3/2005 | Harris et al. | |
| 2005/0101308 A1 | 5/2005 | Lee | |
| 2005/0111430 A1 | 5/2005 | Spear et al. | |
| 2005/0119012 A1 | 6/2005 | Merheb et al. | |
| 2005/0143135 A1 | 6/2005 | Brems et al. | |
| 2005/0164737 A1 | 7/2005 | Brown | |
| 2005/0189337 A1 | 9/2005 | Baune | |
| 2005/0192041 A1 | 9/2005 | Oxley et al. | |
| 2005/0202807 A1 | 9/2005 | Ayyasamy et al. | |
| 2005/0221819 A1 | 10/2005 | Patel et al. | |
| 2005/0232241 A1 | 10/2005 | Wu et al. | |
| 2005/0239485 A1 | 10/2005 | Kundu et al. | |
| 2005/0254464 A1 | 11/2005 | Patel et al. | |
| 2005/0261016 A1 | 11/2005 | Patel et al. | |
| 2006/0003740 A1 | 1/2006 | Munje | |
| 2006/0003751 A1 | 1/2006 | Vo | |
| 2006/0019654 A1 | 1/2006 | Farrill | |
| 2006/0029189 A1 | 2/2006 | Patel et al. | |
| 2006/0030347 A1 | 2/2006 | Biswas | |
| 2006/0056361 A1 | 3/2006 | Jiang et al. | |
| 2006/0067499 A1 | 3/2006 | Oliveira et al. | |
| 2006/0078064 A1 | 4/2006 | Schmidt et al. | |
| 2006/0088065 A1* | 4/2006 | Khatter | H04M 7/006 370/528 |
| 2006/0094455 A1 | 5/2006 | Hannu et al. | |
| 2006/0116150 A1 | 6/2006 | Bhutiani | |
| 2006/0128411 A1 | 6/2006 | Turcanu | |
| 2006/0136201 A1 | 6/2006 | Landron et al. | |
| 2006/0178138 A1 | 8/2006 | Ostroff et al. | |
| 2006/0189337 A1 | 8/2006 | Farrill et al. | |
| 2006/0198334 A1 | 9/2006 | Civanlar et al. | |
| 2006/0229090 A1 | 10/2006 | Ladue | |
| 2006/0234687 A1 | 10/2006 | Patel et al. | |
| 2006/0245394 A1 | 11/2006 | Baba et al. | |
| 2007/0037562 A1 | 2/2007 | Smith-Kerker et al. | |
| 2007/0037597 A1 | 2/2007 | Biswas et al. | |
| 2007/0037598 A1 | 2/2007 | Ayyasamy et al. | |
| 2007/0049314 A1 | 3/2007 | Balachandran et al. | |
| 2007/0070976 A1 | 3/2007 | Mussman et al. | |
| 2007/0099609 A1 | 5/2007 | Cai | |

(56) References Cited

U.S. PATENT DOCUMENTS

| | | |
|---|---|---|
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0299953 A1 | 12/2008 | Rao |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0270105 A1 | 10/2009 | Kakumaru |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0234018 A1 | 9/2010 | Lawler et al. |
| 2010/0284370 A1 | 11/2010 | Samar et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0230305 A1* | 9/2012 | Barbu ................ H04W 48/20 370/338 |
| 2012/0315905 A1* | 12/2012 | Zhu ................ H04W 36/36 455/436 |
| 2013/0155875 A1 | 6/2013 | Ayyasamy et al. |
| 2013/0196706 A1 | 8/2013 | Patel et al. |
| 2013/0337859 A1 | 12/2013 | Patel et al. |
| 2014/0079022 A1* | 3/2014 | Wang ................ H04W 36/22 370/331 |
| 2014/0148210 A1 | 5/2014 | Kundu et al. |
| 2016/0135035 A1* | 5/2016 | Chan ................ H04W 28/0226 370/328 |
| 2016/0150455 A1* | 5/2016 | Suryavanshi ....... H04W 36/245 455/436 |
| 2018/0070263 A1* | 3/2018 | Falconetti ............... H04L 69/16 |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |

OTHER PUBLICATIONS

Nokia: "What is TETRA? Why Nokia TETRA?", The Nokia TETRA Primer, 2002, pp. 1-29.

Skype: "Skype", Web Archive—SKYPE, May 22, 2004, pp. 1-2, May 22, 2004, pp. 1-2.

Trachwell: "TrackWell Software and Tetra Iceland deliver value added services to Tetra users", TRACKWELL.COM, Oct. 2002, pp. 1-1.

\* cited by examiner

SYSTEM AND METHOD FOR PUSH-TO-TALK (PTT) IN HIGH LATENCY NETWORKS

CROSS-REFERENCE TO RELATED APPLICATIONS

The present application is related to and claims benefit under 35 U.S.C. § 119(e) from U.S. Provisional Patent Application Ser. No. 62/401,013, filed Sep. 28, 2016, titled "System and Method for Push-to-Talk (PTT) Adaptations in High Latency Networks", the entire contents of which is being incorporated herein by reference.

BACKGROUND OF THE INVENTION

Push-to-talk (PTT) platforms involve providing PTT functionality (e.g., call group management, call origination, call transmittal, talk-back call termination, floor management, filtering, etc.) through PTT clients on client devices. The PTT functions may be performed by one or more servers, and communications between the client devices and the servers may be performed over a telecommunications network (e.g., a carrier network).

There is a need for a system and method for PTT in high latency networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, a method includes: accessing, by a push to talk (PTT) server, a PTT session with a PTT client operating in a first network; detecting, by the PTT server, a transition by the PTT client from the first network to a second network, the second network having a lower throughput or a higher latency than the first network; and adapting, by the PTT server, one or more parameters of a plurality of communication protocols in response to detecting the transition by the PTT client from the first network to the second network, the communication protocols being host layer protocols used by the PTT server to communicate with the PTT client.

In some embodiments, the parameters of the communication protocols include parameters for a transport protocol of the communication protocols, and the adapting the parameters of the communication protocols includes: changing, by the PTT server, the transport protocol to a connectionless protocol. In some embodiments, the adapting the parameters of the communication protocols further includes: disabling, by the PTT server, encryption for the transport protocol. In some embodiments, the parameters of the communication protocols include parameters for a signaling protocol of the communication protocols, and the adapting the parameters of the communication protocols includes: increasing, by the PTT server, timeout values for the signaling protocol; and increasing, by the PTT server, retransmission times for floor control messages of the PTT session exponentially for each retransmission of the floor control messages. In some embodiments, the method further includes: reverting, by the PTT server, the one or more parameters of the plurality of communication protocols in response to detecting a transition by the PTT client from the second network to a third network having a higher throughput or a lower latency than the second network. In some embodiments, the parameters of the communication protocols include parameters for a media protocol, and the adapting the parameters of the communication protocols includes: caching, by the PTT server, header information of voice packets for the PTT session; and aggregating, by the PTT server, the voice packets for the PTT session in data units transmitted over the second network. In some embodiments, the parameters for the media protocol include codec parameters, and the adapting the parameters of the communication protocols further includes: determining, by the PTT server, a call session quality indicator (CSQI) of the PTT client for the PTT session; and decreasing, by the PTT server, a bitrate of the codec parameters in response to the CSQI of the PTT client decreasing. In some embodiments, the adapting the parameters of the communication protocols includes: suppressing, by the PTT server, transmission of audio for the PTT session to the PTT client in response to a total voice energy of the audio for the PTT session being below a predefined threshold. In some embodiments, the adapting the parameters of the communication protocols further includes: deferring, by the PTT server, synchronization of contact information, group information, presence information, and location information with the PTT client, the synchronization deferred until the PTT client transitions to a third network having a higher throughput or a lower latency than the second network.

In an embodiment, a push-to-talk (PTT) server includes: an electronic processor; and a non-transitory computer readable storage medium storing programming for execution by the electronic processor, the programming including instructions for: accessing, by the PTT server, a PTT session with a PTT client operating in a first network; detecting, by the PTT server, a transition by the PTT client from the first network to a second network, the second network having a lower throughput or a higher latency than the first network;

and adapting, by the PTT server, one or more parameters of a plurality of communication protocols in response to detecting the transition by the PTT client from the first network to the second network, the communication protocols being host layer protocols used by the PTT server to communicate with the PTT client.

In some embodiments, the parameters of the communication protocols include parameters for a transport protocol of the communication protocols, and the instructions for adapting the parameters of the communication protocols include instructions for: changing, by the PTT server, the transport protocol to a connectionless protocol. In some embodiments, the instructions for adapting the parameters of the communication protocols further includes instructions for: disabling, by the PTT server, encryption for the transport protocol. In some embodiments, the parameters of the communication protocols include parameters for a signaling protocol of the communication protocols, and the instructions for adapting the parameters of the communication protocols include instructions for: increasing, by the PTT server, timeout values for the signaling protocol; and increasing, by the PTT server, retransmission times for floor control messages of the PTT session exponentially for each retransmission of the floor control messages. In some embodiments, the instructions for adapting the parameters of the communication protocols include instructions for: deferring, by the PTT server, synchronization of contact information, group information, presence information, and location information with the PTT client, the synchronization deferred until the PTT client transitions to a third network having a higher throughput or a lower latency than the second network. In some embodiments, the parameters of the communication protocols include parameters for a media protocol, and the instructions for adapting the parameters of the communication protocols include instructions for: caching, by the PTT server, header information of voice packets for the PTT session; and aggregating, by the PTT server, the voice packets for the PTT session in data units transmitted over the second network. In some embodiments, the parameters for the media protocol include codec parameters, and the instructions for adapting the parameters of the communication protocols further includes instructions for: determining, by the PTT server, a call session quality indicator (CSQI) of the PTT client for the PTT session; and decreasing, by the PTT server, a bitrate of the codec parameters in response to the CSQI of the PTT client decreasing. In some embodiments, the instructions for adapting the parameters of the communication protocols includes instructions for: suppressing, by the PTT server, transmission of audio for the PTT session to the PTT client in response to a total voice energy of the audio for the PTT session being below a predefined threshold. In some embodiments, the programming further includes instructions for: reverting, by the PTT server, the one or more parameters of the plurality of communication protocols in response to detecting a transition by the PTT client from the second network to a third network having a higher throughput or a lower latency than the second network.

In an embodiment, a method includes: accessing, by a push to talk (PTT) server, a PTT session with a PTT client operating in a first network; receiving, by the PTT server, from the PTT client, an indication that the PTT client has transitioned from the first network to a second network, the second network having a lower throughput or a higher latency than the first network; deferring, by the PTT server, synchronization of contact information, group information, presence information, and location information with the PTT client until the PTT client transitions to a third network having a higher throughput or a lower latency than the second network; caching, by the PTT server, header information of voice packets for the PTT session; and decreasing, by the PTT server, a bitrate of codec parameters for the voice packets in response to a call session quality indicator (CSQI) of the PTT client for the PTT session decreasing.

In some embodiments, the method further includes: disabling, by the PTT server, encryption for a transport protocol used by the PTT server to communicate with the PTT client in response to determining the second network is a satellite network.

Various embodiments are described within a specific context, namely, adaptations for high latency networks in a push to talk (PTT) system. Various embodiments may, however, be applied to other systems and networks where adaptations for high latency networks is desirable.

Figure 1:
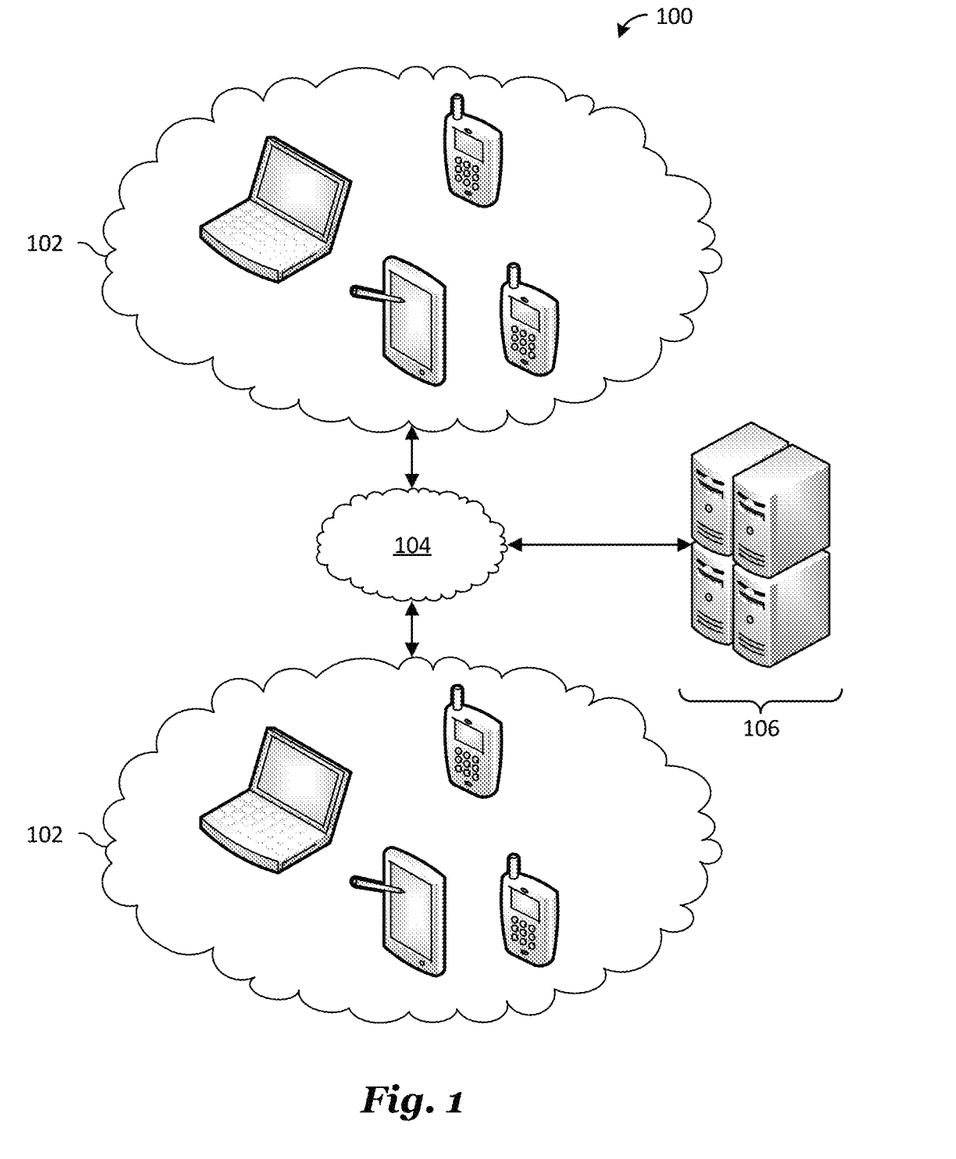
FIG. 1 illustrates a diagram of an embodiment communications network, in accordance with some embodiments.

FIG. 1 illustrates a communications system 100, which provides an architecture for supporting a PTT communications solution, in accordance with some embodiments. Communications system 100 includes client devices 102, a communications network 104, and a PTT platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "PTT clients") reside on client devices 102 for accessing various PTT functions.

Client devices 102 may communicate with PTT platform 106 over network 104, which may be accessed by client devices 102 through a cellular network deployed by a carrier, a WiFi network, a radio access network (RAN), other wireless networks, a wired internet protocol (IP) network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, etc. In some embodiments, network 104 may comprise various other devices, such as relays, low power nodes, etc. Network 104 may further include backhaul network components, such as various gateways, routers, controllers, schedulers, and the like.

In an embodiment where PTT platform 106 is a PTT-over-Cellular (PoC) platform, subscribers to a PTT solution (e.g., users operating client devices 102) may be provisioned onto system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. PTT platform 106 may provide a plurality of PTT functions to client devices 102 through the PTT clients on client devices 102 as described in greater detail below.

In some embodiments, PTT platform 106 uses container technology for virtualization of a PTT system architecture, such as, the virtualization of provided PTT services. Example container technologies may include Docker, Rocket, LXD, and the like although the architecture is not limited to a specific container technology. Virtualization using container technology may allow PTT platform 106 to adopt a micro-services model in which service clusters are considered the building blocks of the system architecture. For example, each function provided by PTT platform 106 may be virtualized in a unique service cluster, and each service cluster may perform a different function in PTT platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the PTT platform) to be independently deployed and managed. Thus, system resilience may be improved as failures are localized to individual services. Furthermore, rapid and agile deployment of services may also be achieved.

In some embodiments, PTT platform 106 incorporates distributed databases, clustering technologies, data analytics tools, and messaging middleware to provide a robust, scalable platform. PTT platform 106 may use fully virtualized components with a layered approach to service orchestration, which allows PTT platform 106 to be integrated into various cloud environments, such as a carrier's private cloud infrastructure, a dedicated PTT cloud infrastructure, combinations thereof, and the like. Other telecommunication services platforms, including other PTT platforms, may be used in other embodiments.

Generally, PTT services are deployed over low latency networks (e.g., networks where end-to-end latency is less than about 150 milliseconds). However, PTT services can also be deployed for high latency networks and low throughput data networks. Example high latency networks may include satellite radio based networks or 2G networks, which may experience end-to-end latencies of more than 500 milliseconds and data rates less than 400 kilobytes per second (kbps). As used herein, a "high latency network" may be used to refer to any network where end-to-end latency is greater than about 150 milliseconds. In order to efficiently communicate over such high latency networks, adaptations to voice over internet protocol (VoIP) technologies at various levels (e.g., transport, signaling/synchronization, media, codec, combinations thereof, or the like) may be advantageous. In accordance with various embodiments, communication protocol parameters for VoIP communications are adapted for high latency networks.

Figure 2:
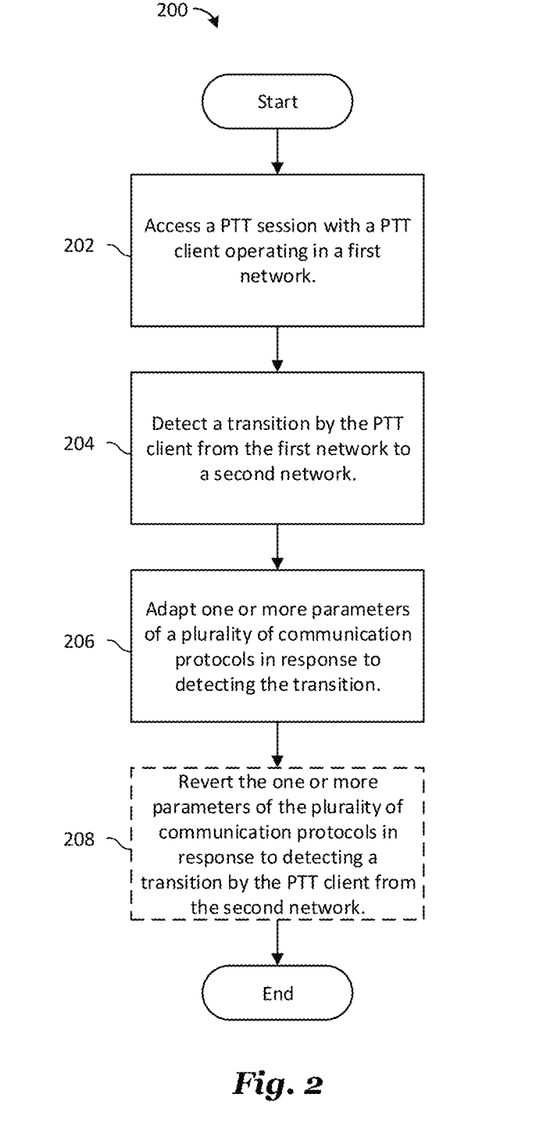
FIG. 2 illustrates a method for adapting communication protocol parameters, in accordance with some embodiments.

FIG. 2 illustrates a method 200 for adapting communication protocol parameters, in accordance with some embodiments. The communication protocols may be host layer protocols, e.g., Layers 4, 5, 6, and 7 of the Open Systems Interconnection (OSI) model. The method 200 may be performed by a PTT server (e.g., part of the PTT platform 106) to adapt the communication protocol parameters for the network 140, which is used by the PTT server to communicate with a PTT client (e.g., operating on a client device 102).

In step 202, the PTT server accesses a PTT session with a PTT client operating in a first network. The PTT session is a group call, and the PTT client is one of a plurality of PTT clients participating in the PTT session. The first network may be a low latency network, such as a Wi-Fi, 3G, or LTE network. Accessing the PTT session may include accessing an existing (a priori) PTT session with the PTT client, or initiating a new PTT session with the PTT client.

In step 204, the PTT server detects a transition by the PTT client from the first network to a second network. The second network has a lower throughput or a higher latency than the first network. For example, the second network may be a high latency network, such as a satellite or 2G network. The transition may be detected by the PTT server, or may be directly indicated by the PTT client. In some embodiments, the PTT server detects the network transition by, e.g., detecting a degradation in the communications channel between the PTT server and the PTT client. For example, the PTT server may detect a channel degradation by detecting a degradation in latency, jittery, speed, etc. In some embodiments, the PTT server receives an indication from the PTT client that the PTT client has transitioned from the first network to the second network. For example, the PTT client may detect a network change by receiving a notification from the driver or firmware of a wireless radio of the client device 102, or by receiving a notification from networking middleware of the client device 102, and may then send the indication to the PTT server in response to the network change.

In step 206, the PTT server adapts one or more parameters of a plurality of communication protocols in response to detecting the transition by the PTT client from the first network to the second network. The communication protocols are host layer protocols used by the PTT server to communicate with the PTT client. The communication protocol parameters that may be adapted include transport protocol parameters, signaling/synchronization protocol parameters, media protocol parameters, codec parameters, combinations thereof, or the like.

In step 208, the PTT server reverts the one or more parameters of the plurality of communication protocols in response to detecting a transition by the PTT client from the second network to a third network. The third network has a higher throughput or a lower latency than the second network. The third network is a lower latency network (e.g., cellular network (e.g., 3G, 4G, LTE, 5G) or Wi-Fi), and may be the first network or a different network. Step 208 is optional, as indicated by the dashed border. As discussed further below, the one or more parameters of the plurality of communication protocols may be reverted to the same values as before the transition to the second network (e.g., the values after initiation of the PTT session), or to different values than those used before the transition to the second network.

In some embodiments, the PTT client may store the communication protocol parameters for the second network at the client device 102. As such, the PTT client may recall the parameters such that, when a new PTT call is subsequently conducted on the second network, the PTT client may re-used the communication protocol parameters. Repeated re-adaption of the communication protocol parameters by the PTT server may thus be avoided.

Figure 3:
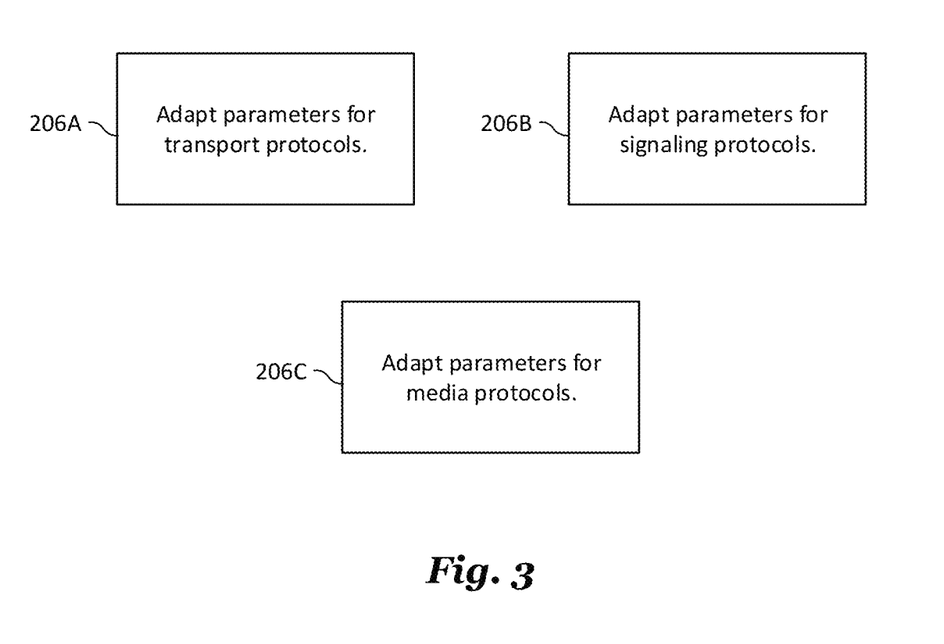
FIG. 3 illustrates operations that may be performed during the method for adapting communication protocol parameters, in accordance with some embodiments.

FIG. 3 illustrates operations 206A, 206B, 206C, and 206D that may be performed during step 206 of the method 200 for adapting communication protocol parameters. The operations 206A, 206B, 206C, and 206D are all used to adapt one or more parameters of respective communication protocols when communications between the client device 102 and telecommunications services platform 106 (e.g., PTT platform) is performed over a high latency network. Any or all of the operations 206A, 206B, 206C, or 206D may be performed.

In operation 206A, parameters for transport protocols may be adapted. In an embodiment, some or all transmissions related to media and/or call signaling may be made over a connectionless protocol, such as user datagram protocol (UDP). In contrast, when a low latency network is used for communications between the client device 102 and platform 106, a connection-oriented protocol, such as transmission control protocol (TCP), can be used for media and call signaling. The PTT server may change the transport protocol to the connectionless protocol. By using connectionless instead of connection-oriented protocols, the amount of retries (e.g., TCP-level retries) performed over slower radio and high latency networks can be eliminated or at least reduced. Furthermore, additional retransmission overhead (e.g., TCP timers, SIP timers, media timers, etc.) of connection-oriented protocols such as TCP can be reduced.

In an embodiment, transport protocols with no encryption may be used when a secured network is used for communications between client device 102 and platform 106. The PTT server may disable encryption for the transport protocol, e.g., in response to determining the use of encryption would cause call quality or performance to decrease below an acceptable level, or in response to determining the second network is a secured network. Encryption can be disabled or eliminated when using types of networks that are typically secure. For example, satellite access points (e.g., analogous to a satellite base station) and the corresponding core network of the satellite network (e.g., analogous to an evolved packet system (EPS) core network) are typically secured by the operator. In such networks, use of encryption at the transport protocol may be unnecessary, and security-based transmissions may be reduced. For example, protocols without encryption (e.g., UDP) may be used in lieu of encryption-based protocols (e.g., datagram transport layer security (DTLS)). As another example, TCP may be used for non-call related signaling in lieu of transport layer security (TLS). By eliminating (or at least reducing) security-based transmissions, transmission protocol overhead may be reduced, and the PTT client on the client device 102 may communicate more efficiently with backend servers of the satellite network and/or PTT platform 106. In contrast, other types of high latency networks (e.g., 2G networks) may not be secure (or at least less secure than satellite networks), and encryption may be prudent when using a less secure network to communicate between the client device 102 and platform 106.

As noted above, the one or more parameters of the plurality of communication protocols may be reverted in response to the PTT client transitioning back to a low latency network. In embodiments where the parameters for transport protocols are adapted, reversion may include reverting, e.g., the transport protocol may be reverted back to a connection-oriented protocol, and/or encryption may be re-enabled. The new connection-oriented protocol may be the same as the original, or different. Encryption may be performed with the same encryption algorithm as the original encryption algorithm, or a different encryption algorithm.

In operation 206B, parameters for signaling protocols may be adapted. A PTT client on the client device 102 may synchronize client data with various server(s) of platform 106 during client login, which generates network traffic. For example, during login or registration with the platform 106, the PTT client may synchronize changes related to contact information, group information, presence information, location information, maps, configurations, periodic session initiation protocol (SIP) dialog refreshes, combinations thereof, or the like. Because high latency networks are constrained for bandwidth and have higher latency, login times for the PTT client could be several minutes in length (e.g., about 3 minutes) when a full synchronization of data is performed. Various embodiments may employ one or more of the following adaptations to the signaling protocols, which may improve PTT call setup/control experience, and may reduce client login time when using a high latency network.

In an embodiment, the PTT server may extend or eliminate expiration timer(s) for SIP refresh dialogs, which are used for some information signaling with the platform 106. For example, SIP reference dialogs may be set to not expire, or to expire after several days. Extending or eliminating the expiration timer(s) may reduce unnecessary retransmissions on high latency networks.

In an embodiment, the PTT server may defer synchronization of certain data (e.g. contact/group management information, presence information, location information, combinations thereof, or the like) until the client device 102 is connected to platform 106 using a third network having a higher throughput or a lower latency than the second network. The third network is a lower latency network (e.g., cellular network (e.g., 3G, 4G, LTE, 5G) or Wi-Fi), and may be the first network or a different network. Deferring synchronization of certain types of data while using a high latency network can be achieved by not registering for document changes related to contact/group management (e.g., not transmitting SIP subscribe, location publish, RLS subscribe, etc. messages) while the client device 102 is connected using the high latency network.

In an embodiment, the PTT server may increase timeout timers for various aspects of networking, such as the timeout values for the signaling protocol. Network address translator (NAT) timers may be increased, which reduces the frequency of periodic refreshes, thereby reducing overall bandwidth use. Other timeout values may also be increased. For example, when making a PTT call, a REFER message may time out due to delay caused by the high latency network. When a REFER message times out, call failures may result. By increasing timeout timers, call completion rates on the high latency network can be increased.

In an embodiment, the PTT server may increase retransmission timers for various aspects of networking, such as the retransmission time values for the signaling protocol. The length of SIP stack retransmission timers (e.g., INVITE, REFER, options, or any transaction initiated timer) may be increased. For example, one or more SIP stack re-transmission timers or other transaction initiated timers could be set to 30 seconds or more. Of particular note, retransmission timers for floor control messages of the PTT call may be increased, which may improve the overall PTT floor control user experience and consistency. By increasing the length of such timers, retransmissions triggered by delay due to high network latency can be reduced.

As noted above, the one or more parameters of the plurality of communication protocols may be reverted in response to the PTT client transitioning back to a low latency network. In embodiments where the parameters for signaling protocols are adapted, reversion may include reverting, e.g., the expiration timer(s) for SIP refresh dialogs, the timeout values for networking, and/or the retransmission timers for networking. The new SIP refresh dialog expiration may be the same as the original, or different. The new timeout values for networking may be the same as the original, or different. The new retransmission timers for networking may be the same as the original, or different.

In operation 206C, parameters for media protocols may be adapted. In an embodiment, media-related packets are aggregated or compressed. The transmission of media-related packets over a low latency network may include the transmission of static information (e.g., headers) with each packet. This static information generally does not change across voice frames or across different packets, or changes in a predictable manner that may be determined by the client device 102 and platform 106. For example, the static information may change by a predetermined amount between each transmission. In some embodiments, the static information is transmitted once (e.g., with an initial packet) for a media session over a high latency network. For example, the initial packet may be the first packet of an audio stream for the PTT call session. The client device 102 or platform 106 may cache the static information, and the static information may not be transmitted with each packet. For example, header information of voice packets for the PTT session may be cached by the PTT server and/or client. In other embodiments, the static information is known to the client device 102 or platform 106 prior to the PTT session, and so the static information may be omitted from all transmissions. In some embodiments, static information may be compressed or cached by codec payload header compression, RTP custom header compression, or the like. When a change to the static information is made (e.g., either by the client device 102 or platform 106), an update may be transmitted with a next packet. The client device 102 and/or platform 106 may assume the static information is valid until an update is received.

In an embodiment, packet aggregation schemes, such as RTP packet aggregation, may be adapted when communicating over a high latency network. Voice packets for the PTT session may be aggregated for transmission in data units. For example, an embodiment RTP packet aggregation scheme for communication over lower latency networks (e.g., cellular networks or Wi-Fi) may aggregate 6 or 7 frames per packet. In such embodiments, a RTP packet aggregation scheme for communication over higher latency networks (e.g., satellite or 2G networks) may aggregate 15-20 frames per packet. By increasing the number of frames per packet, overall header related overhead can be reduced for a transmission stream. As noted above, the header information may not change across voice frames, and so more aggressive voice packet aggregation may allow a reduction in transmission of redundant information.

In an embodiment, the media protocol parameters include parameters for codecs used to encode media (e.g., voice packets), which are adapted when communicating over a high latency network. The codec used may be changed, or the bit rate of the codec may be changed. For example, an embodiment codec for use to encode media may include Codec2 or advanced multiband excitation (AMBE), with a bit rate of 3.2 kbps or lower. Such codecs may be used when the client device 102 operates on higher latency networks. In contrast, an embodiment codec (e.g., adaptive multi-rate (AMR)) used to encode media transmitted over low latency networks (e.g., cellular networks or Wi-Fi) may have a higher bit rate than the embodiment codecs used for the high latency networks.

In addition to (or in lieu of) selecting a different codec, noise and silence suppression techniques may be employed to reduce overhead of packet transmissions (e.g., voice packet transmissions) when using the high latency network. In an embodiment silence suppression technique, voice samples are evaluated for the presence of voice or silence. If a low voice energy is detected (e.g., the total volume of the voices in the audio stream for the PTT call session is below a predefined threshold), the voice samples are dropped (e.g., at the client device 102 or the platform 106), which may lower bandwidth requirements. Determining the voice energy of the audio stream may include filtering out background noise from the audio stream, and determining the total volume of the voices in the filtered audio stream. If valid voice samples are detected (e.g., the total volume of the voices in the PTT call session is above the predefined threshold), the voice samples transmitted to the platform 106. In an embodiment noise cancellation technique, the background noise from the environment is separated and eliminated (or at least reduced) from voice speech samples, thus improving clarity of voice samples.

In an embodiment, the client device 102 and/or platform 106 monitors link quality between the client device 102 and platform 106 over the high latency network. The link quality may be monitored by determining a Kodiak™ Call Session Quality Indicator (CSQI) for the PTT session. The CSQI may be determined by determining channel parameters for a channel between the client device 102 and platform 106, and calculating the CSQI in accordance with the channel parameters of the channel Example channel parameters include latency, packet loss, jitter, bandwidth, and the like. In response to the detected link quality parameter(s), codec rates may be adapted accordingly, as described above. For example, codec rates may be lowered when the detected link quality degrades (e.g., the monitored link quality parameter(s) falls below a threshold). As another example, codec rates may be maintained or increased in response to detected link quality improvement or stasis (e.g., the monitored link quality parameter(s) goes above a threshold or stays the same).

As noted above, the one or more parameters of the plurality of communication protocols may be reverted in response to the PTT client transitioning back to a low latency network. In embodiments where the parameters for media protocols are adapted, reversion may include reverting, e.g., static information compression settings, the packet aggregation value, the selected codec or bitrate, and/or use of noise and silence suppression. The static information compression settings may be the same as the original, or different. The packet aggregation value may be the same as the original, or different. The new codec or bitrate may be the same as the original, or different.

Embodiments may achieve advantages. Adapting the parameters of the communication protocols may reduce the bandwidth used by the PTT session, thereby increasing the clarity and responsiveness of the PTT call for high latency networks. Further, by tuning certain timeout and retransmission parameters, the reliability of the PTT call may be improved for high latency networks.

Figure 4:
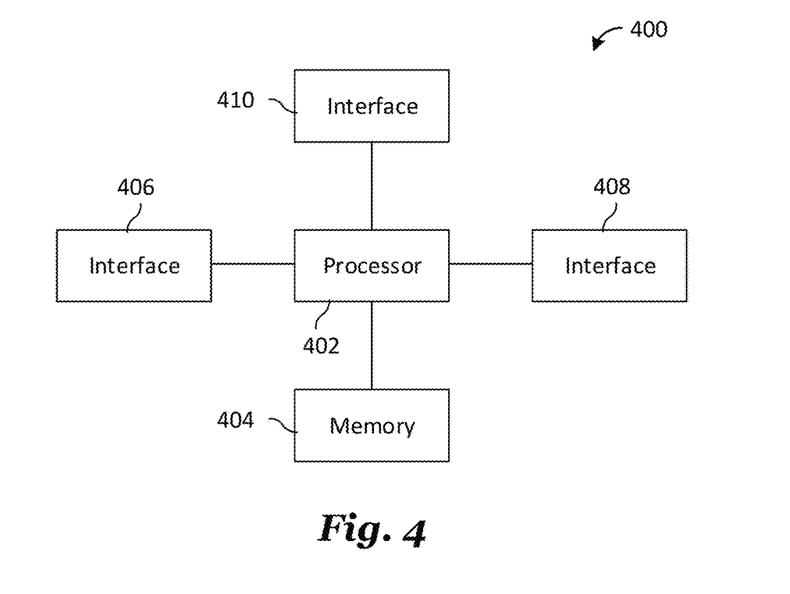
FIG. 4 illustrates a diagram of a processing system, in accordance with some embodiments.

FIG. 4 illustrates a block diagram of a processing system 400 for performing methods described herein, which may be installed in a host device, in accordance with some embodiments. As shown, the processing system 400 includes an electronic processor 404, a memory 406, and interfaces 410-414, which may (or may not) be arranged as shown in FIG. 4 The processor 404 may be any component or collection of components adapted to perform computations and/or other processing related tasks, and the memory 406 may be any component or collection of components adapted to store programming and/or instructions for execution by the processor 404. In an embodiment, the processor 404 is a component of an embodiment server and is configured to access a PTT session with an embodiment PTT client operating in a first network as described above; detect a transition by the client from the first network to a second network as described above; adapt one or more parameters of a plurality of communication protocols in response to detecting the transition by the PTT client as described above; combinations thereof; or the like. In an embodiment, the processor 404 is a component of a client device, which is configured to run a client as described above. In such embodiments, the processor 404 may be configured to use the network having the communication protocol parameters as described above. In an embodiment, the memory 406 includes a non-transitory computer readable medium. In an embodiment, the memory 406 stores the communication protocol parameters as described above. In such embodiments, the processor 404 may be configured to retrieve the communication protocol parameters stored in the memory 406 and adapt the communications network 104 in accordance with the communication protocol parameters. The interfaces 410, 412, 414 may be any component or collection of components that allow the processing system 400 to communicate with other devices/components and/or a user. For example, one or more of the interfaces 410, 412, 414 may be adapted to communicate data, control, or management messages from the processor 404 to applications installed on the host device and/or a remote device. As another example, one or more of the interfaces 410, 412, 414 may be adapted to allow a user or user device (e.g., personal computer (PC), etc.) to interact/communicate with the processing system 400. The processing system 400 may include additional components not depicted in FIG. 4, such as long term storage (e.g., non-volatile memory, etc.).

In some embodiments, the processing system 400 is included in a network device that is accessing, or part otherwise of, a telecommunications network. In one example, the processing system 400 is in a network-side device in a wireless or wireline telecommunications network, such as a base station, a relay station, a scheduler, a controller, a gateway, a router, an applications server, or any other device in the telecommunications network. In other embodiments, the processing system 400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 5:
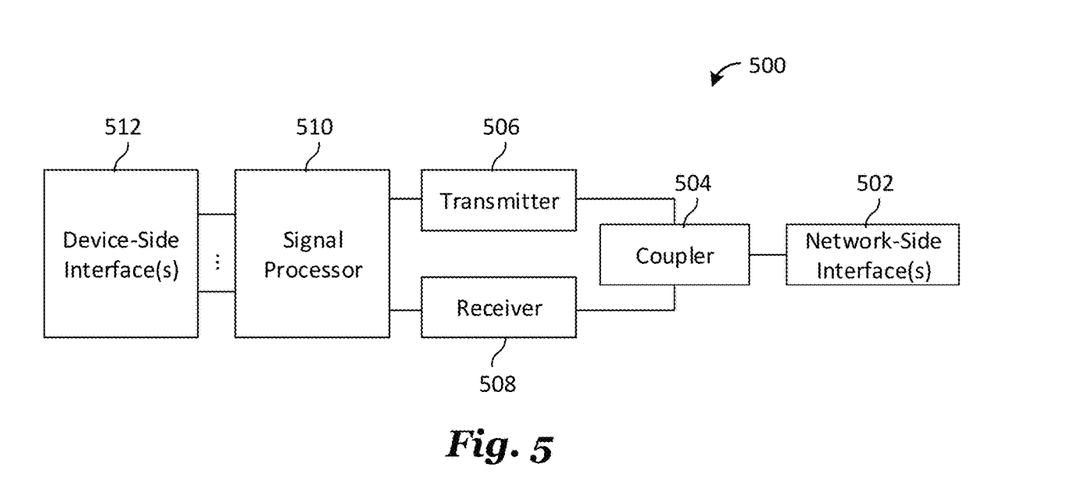
FIG. 5 illustrates a diagram of a transceiver, in accordance with some embodiments.

In some embodiments, one or more of the interfaces 410, 412, 414 connects the processing system 400 to a transceiver adapted to transmit and receive signaling over the telecommunications network. FIG. 5 illustrates a block diagram of a transceiver 500 adapted to transmit and receive signaling over a telecommunications network, in accordance with some embodiments. In an embodiment, the transceiver 500 transmits or receives communication protocol parameters as described above depending on whether the transceiver 500 is part of a server, a client device, or a network device; the transceiver 500 is configured to communicate with a PTT client when the transceiver 500 is part of a server. The transceiver 500 may be installed in a host device. As shown, the transceiver 500 comprises a network-side interface 502, a coupler 504, a transmitter 506, a receiver 508, a signal processor 510, and a device-side interface 512. The network-side interface 502 may include any component or collection of components adapted to transmit or receive signaling over a wireless or wireline telecommunications network. The coupler 504 may include any component or collection of components adapted to facilitate bi-directional communication over the network-side interface 502. The transmitter 506 may include any component or collection of components (e.g., up-converter, power amplifier, etc.) adapted to convert a baseband signal into a modulated carrier signal suitable for transmission over the network-side interface 502. The receiver 508 may include any component or collection of components (e.g., down-converter, low noise amplifier, etc.) adapted to convert a carrier signal received over the network-side interface 502 into a baseband signal. The signal processor 510 may include any component or collection of components adapted to convert a baseband signal into a data signal suitable for communication over the device-side interface(s) 512, or vice-versa. The device-side interface(s) 512 may include any component or collection of components adapted to communicate data-signals between the signal processor 510 and components within the host device (e.g., the processing system 400, local area network (LAN) ports, etc.).

The transceiver 500 may transmit and receive signaling over any type of communications medium. In some embodiments, the transceiver 500 transmits and receives signaling over a wireless medium. For example, the transceiver 500 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 502 comprises one or more antenna/radiating elements. For example, the network-side interface 502 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
accessing, by a push to talk (PTT) server, a PTT session with a PTT client operating in a first network;
detecting, by the PTT server, a transition by the PTT client from the first network to a second network, the second network having a lower throughput or a higher latency than the first network; and
adapting, by the PTT server, one or more parameters of a plurality of communication protocols in response to detecting the transition by the PTT client from the first network to the second network, the communication protocols being host layer protocols used by the PTT server to communicate with the PTT client, wherein the adapting the parameters of the communication protocols comprises changing, by the PTT server, the transport protocol to a connectionless protocol, wherein the parameters of the communication protocols include parameters for a media protocol, and wherein the adapting the parameters of the communication protocols comprises:
caching, by the PTT server, header information of voice packets for the PTT session; and
aggregating, by the PTT server, the voice packets for the PTT session in data units transmitted over the second network; and
wherein the parameters for the media protocol include codec parameters, and wherein the adapting the parameters of the communication protocols further comprises:
determining, by the PTT server, a call session quality indicator (CSQI) of the PTT client for the PTT session; and
decreasing, by the PTT server, a bitrate of the codec parameters in response to the CSQI of the PTT client decreasing.

2. The method of claim 1, wherein the adapting the parameters of the communication protocols further comprises:
disabling, by the PTT server, encryption for the transport protocol.

3. The method of claim 1, wherein the parameters of the communication protocols include parameters for a signaling protocol of the communication protocols, and wherein the adapting the parameters of the communication protocols comprises:
increasing, by the PTT server, timeout values for the signaling protocol; and
increasing, by the PTT server, retransmission times for floor control messages of the PTT session exponentially for each retransmission of the floor control messages.

4. The method of claim 1, further comprising:
reverting, by the PTT server, the one or more parameters of the plurality of communication protocols in response to detecting a transition by the PTT client from the second network to a third network having a higher throughput or a lower latency than the second network.

5. The method of claim 1, wherein the adapting the parameters of the communication protocols comprises:
suppressing, by the PTT server, transmission of audio for the PTT session to the PTT client in response to a total voice energy of the audio for the PTT session being below a predefined threshold.

6. The method of claim 1, wherein the adapting the parameters of the communication protocols further comprises:
deferring, by the PTT server, synchronization of contact information, group information, presence information, and location information with the PTT client, the synchronization deferred until the PTT client transitions to a third network having a higher throughput or a lower latency than the second network.

7. A push-to-talk (PTT) server comprising:
a transceiver configured to communicate with a PTT client;
a memory configured to store a plurality of first parameters; and
an electronic processor configured to:
 access a PTT session with the PTT client operating in a first network;
 detect a transition by the PTT client from the first network to a second network, the second network having a lower throughput or a higher latency than the first network; and
 adapt one or more parameters of a plurality of communication protocols according to the first parameters in response to detecting the transition by the PTT client from the first network to the second network, the communication protocols being host layer protocols used by the PTT server to communicate with the PTT client, wherein the electronic processor adapts the parameters of the communication protocols by changing the transport protocol to a connectionless protocol, wherein the parameters of the communication protocols include parameters for a media protocol, and wherein the electronic processor adapts the parameters of the communication protocols by:
  caching header information of voice packets for the PTT session; and
  aggregating the voice packets for the PTT session in data units transmitted over the second network; and
 wherein the parameters for the media protocol include codec parameters, and wherein the electronic processor further adapts the parameters of the communication protocols by:
  determining a call session quality indicator (CSQI) of the PTT client for the PTT session; and
  decreasing a bitrate of the codec parameters in response to the CSQI of the PTT client decreasing.

8. The PTT server of claim 7, wherein the electronic processor further adapts the parameters of the communication protocols by:
 disabling encryption for the transport protocol.

9. The PTT server of claim 7, wherein the parameters of the communication protocols include parameters for a signaling protocol of the communication protocols, and wherein the electronic processor adapts the parameters of the communication protocols by:
 increasing timeout values for the signaling protocol; and
 increasing retransmission times for floor control messages of the PTT session exponentially for each retransmission of the floor control messages.

10. The PTT server of claim 7, wherein the electronic processor adapts the parameters of the communication protocols by:
 deferring, by the PTT server, synchronization of contact information, group information, presence information, and location information with the PTT client, the synchronization deferred until the PTT client transitions to a third network having a higher throughput or a lower latency than the second network.

11. The PTT server of claim 7, wherein the electronic processor adapts the parameters of the communication protocols by:
 suppressing transmission of audio for the PTT session to the PTT client in response to a total voice energy of the audio for the PTT session being below a predefined threshold.

12. The PTT server of claim 7, wherein the electronic processor is further configured to:
 revert the one or more parameters of the plurality of communication protocols in response to detecting a transition by the PTT client from the second network to a third network having a higher throughput or a lower latency than the second network.

13. A method comprising:
 accessing, by a push to talk (PTT) server, a PTT session with a PTT client operating in a first network;
 receiving, by the PTT server, from the PTT client, an indication that the PTT client has transitioned from the first network to a second network, the second network having a lower throughput or a higher latency than the first network;
 deferring, by the PTT server, synchronization of contact information, group information, presence information, and location information with the PTT client until the PTT client transitions to a third network having a higher throughput or a lower latency than the second network;
 caching, by the PTT server, header information of voice packets for the PTT session; and
 decreasing, by the PTT server, a bitrate of codec parameters for the voice packets in response to a call session quality indicator (CSQI) of the PTT client for the PTT session decreasing.

14. The method of claim 13, further comprising:
 disabling, by the PTT server, encryption for a transport protocol used by the PTT server to communicate with the PTT client in response to determining the second network is a satellite network.

* * * * *